United States Patent [19]
Larrable

[11] 3,821,915
[45] July 2, 1974

[54] FIBER CUTTING APPARATUS WITH SELF-CONTAINED BLADE SHARPENER

[75] Inventor: William T. Larrable, San Dimas, Calif.

[73] Assignee: Paper-Pak Products, Inc., La Verne, Calif.

[22] Filed: July 11, 1972

[21] Appl. No.: 270,810

[52] U.S. Cl.............. 83/174, 83/455, 83/477.2, 83/489, 83/649
[51] Int. Cl............................................ B26d 7/08
[58] Field of Search............ 83/174, 399, 454, 455, 83/484, 483, 487, 488, 489, 524, 578, 613, 614, 665, 676, 649, 698; 30/273, 276

[56] References Cited
UNITED STATES PATENTS

| | | | |
|---|---|---|---|
| 954,705 | 4/1910 | Slaybaugn et al.............. | 83/489 X |
| 1,992,755 | 5/1911 | Crocker........................ | 83/455 |
| 2,222,528 | 11/1940 | Chilton........................ | 83/489 X |
| 2,609,014 | 9/1952 | Schwantes..................... | 83/455 |
| 2,746,545 | 5/1956 | Chamberlain.................. | 83/489 |
| 3,181,406 | 5/1965 | Sayles......................... | 83/488 |
| 3,298,413 | 1/1967 | Engi............................ | 83/174 |
| 3,540,337 | 11/1970 | Gardner....................... | 83/649 X |

Primary Examiner—Andrew R. Juhasz
Assistant Examiner—W. D. Bray
Attorney, Agent, or Firm—Henry M. Bissell

[57] ABSTRACT

A mechanically driven, rotary blade cutting device for cutting various types of fibers and sheet materials. The device includes a rotary blade shaft-mounted on a carriage for transverse movement across the material to be cut. Along the carriage traverse is a sprocket chain to which the blade is coupled by means of a sprocket wheel on the end of its shaft. The rate of blade rotation as driven by the sprocket-gear arrangement develops a sawing or slicing action for increased effectiveness in cutting the materials involved. Handles are provided on the blade housing to permit propelling the carriage in either direction and from either side. The rack on which the unit is mounted has a support for rolls of sheet materials to be cut, is portable, and is arranged to be bench or wall mounted. The unit also includes in combination with the blade a particular blade sharpening mechanism comprising a pair of grinding wheels angled to develop the desired sharpened blade angle. The sharpening mechanism is pivoted for use as desired and, when in blade-engaging position, its rotary sharpening wheels are driven by the rotation of the blade itself to accomplish the sharpening as the cutting mechanism is operated.

15 Claims, 4 Drawing Figures

FIBER CUTTING APPARATUS WITH SELF-CONTAINER BLADE SHARPENER

BACKGROUND OF THE INVENTION

1. Field of the Invention

This invention relates to cutting devices, and more particularly to cutting devices including mechanism for driving a rotary blade.

2. Description of the Prior Art

Various mechanisms have been devised to facilitate the cutting of multi-layer sheet materials. Most of these fall into two types: those depending upon a shearing action as exemplified by ordinary scissors and the more common type of office paper cutter, and those using a sawing action, such as a knife or power driven blades.

Particular problems arise in connection with the dispensing of bulk rolled packing materials. Such materials typically comprise multi-layer tissue paper type wadding which, when used in appropriate lengths and with proper wrapping, provides an economical and effective packing material for many objects that are to be packaged for shipping. Because the wadding comprises a number of layers of resilient, soft but tough material, the wadding is difficult to cut with conventional mechanisms. A shearing type of cutter is generally ineffective for this purpose. The material is difficult to tear. Motor driven cutters using rotary blades are effective, but tend to limit use of the cutter to a rather permanent type installation accessible to power mains whereas there is a considerable need for this type of packing material in the field, such as in vans where items are being packed for shipment, freight cars, loading docks, and the like. Even where such motor driven, rotary blade cutters are employed, the matter of keeping the blade sharp is also a problem. Many of the materials used in wadding type packing material are fairly abrasive, so that repeated use of any type of cutting blade quickly wears down the sharp edge which is essential in order to cut the type of material involved.

Various gear and belt driven rotary blade cutters have been employed in the past, principally for the purpose of cutting cloth or paper products. Examples of such prior art arrangements may be found in U.S. Pat. Nos. 504,509, 636,998, 729,127, 2,222,528 and 2,727,571. Some even provided for sharpening the cutting blades, as for example in U.S. Pat. No. 355,085. However, such prior art arrangements as are known are generally large, cumbersome, difficult to operate, expensive to manufacture and/or require external electrical or mechanical power, and are inappropriate for the purposes of the present invention.

It is therefore a general object of the present invention to provide an improved cutting apparatus for dispensing and cutting bulk rolled packing material.

It is a further object of the present invention to provide an improved blade sharpening arrangement for use with the cutting mechanism of the invention.

SUMMARY OF THE INVENTION

In brief, the present invention involves a cutting head which is mounted on guides of a track for easy movement from side to side by pushing or pulling with one hand. Housed within the cutting head is a circular knife blade which is rotated so as to develop a slicing or sawing action to cut the packing or other material as the head is moved along its track. The spinning action of the blade is effected by a sprocket wheel on the blade shaft which is meshed with a sprocket or roller-type chain fixed to the frame base in a straight line parallel to the direction of movement of the cutting head. The components of such a drive arrangement are inexpensive, longlasting in use and readily available commercially. Moreover, in accordance with an aspect of the invention, the drive arrangement permits ready removal and replacement and may accommodate changing the drive ratio of the blade. The circular knife blade and the drive sprocket wheel or gear are mounted on a common shaft which is allowed to rotate in a bearing in the cutting head. The blade is substantially larger in diameter than is the sprocket gear, thus developing a peripheral velocity for the blade which considerably exceeds the velocity resulting if the blade were merely rolled across the material. In this manner, the blade effectively cuts the material by a slicing or sawing action without touching anything but the material.

In accordance with an aspect of the invention, a frame is provided which supports both the cutting head and a roll of the material to be cut and serves to dispense the material as needed to the cutting bed. The frame is provided with guide rollers which allow the packing material to be easily pulled from the supply wheel through the cutting section in the dispensing direction while preventing the material from being retracted unless it is fed back by the operator.

The preferred arrangement in accordance with the invention also includes a blade sharpening device in the form of a pair of rotatable grinding wheels angled by an appropriate amount relative to the blade so as to develop the desired blade angle during the sharpening process. The grinding wheels are mounted on a pivoted lever by which the wheels may be selectively moved into engagement with the blade whenever it needs sharpening. With the sharpening wheels in blade engaging position, operation of the cutting head along its track, as in the normal cutting procedure, serves to cause the wheels to roll along the entire periphery of the blade, thus accomplishing the sharpening process. When the blade is sharpened satisfactorily, the grinding wheels may be pivoted out of the way until they are needed again.

In one embodiment in accordance with the invention, the cutting head is supported on and guided along its track by means of guide pulleys, at least one of which is adjustable by means of an eccentric locating element to provide easy and effective alignment of the cutting head carriage on the track while also permitting it to be released and removed therefrom if need be. The frame is such that it may be mounted in either the horizontal or vertical position for operation of the cutting device and is provided with hangers when the entire unit is to be mounted on a wall. The machine is lightweight and portable, extremely rugged, reliable and effective, and may be used for cutting a variety of materials of varying thickness, roll width and diameter, working equally well with many papers and plastic films, wadding, fibers, and other types of material. It is also effective in cutting spongy foam plastic cushioning material. It can be used in locations and under circumstances which are not suitable for the use of motor-driven cutting machines and, because it effectively overcomes a previous obstacle to the use of multi-layer tissue paper type wadding as packing materials, it will fill a need in every

BRIEF DESCRIPTION OF THE DRAWING

A better understanding of the present invention may be had from a consideration of the following detailed description, taken in conjunction with the accompanying drawing, in which.

DESCRIPTION OF THE PREFERRED EMBODIMENT

Figure 1:
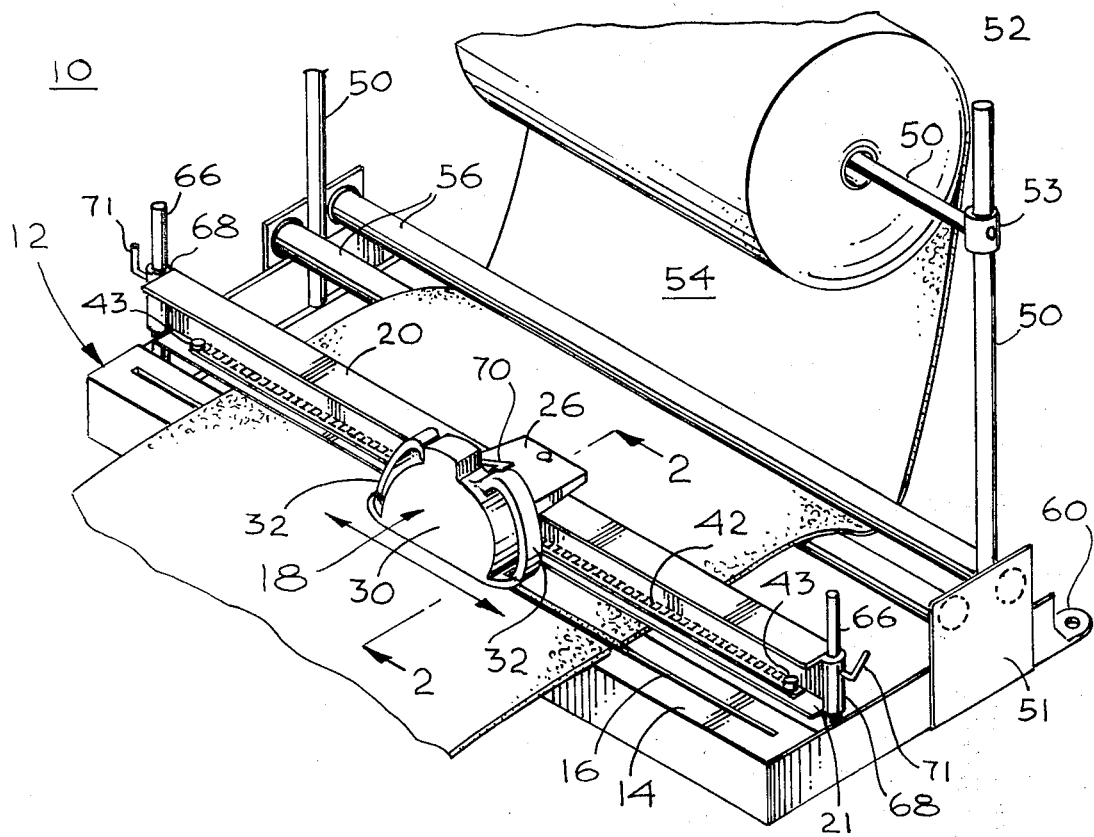
FIG. 1 is a perspective view of one particular arrangement in accordance with the invention showing the cutting device as set up for use in cutting a particular type of roll type material.
Figure 2:
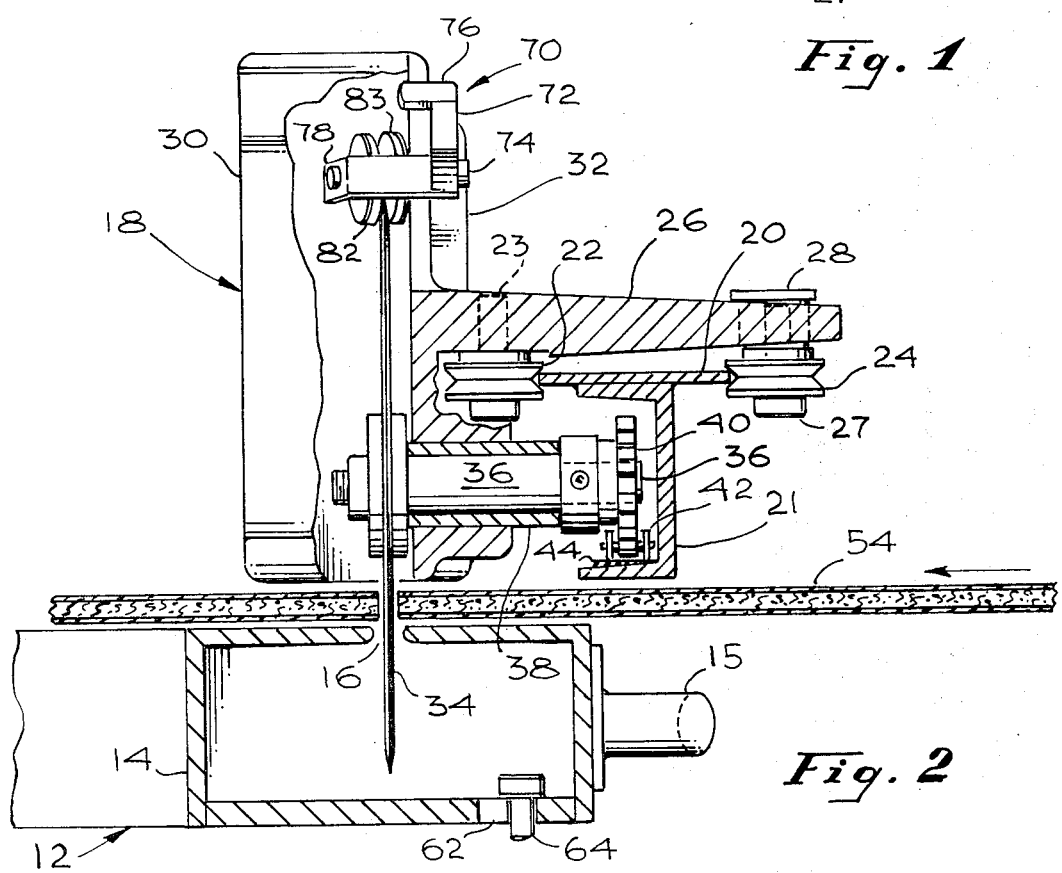
FIG. 2 is an elevational view, partially in section and partially broken away, of a portion of the arrangement of FIG. 1, taken along the line 2—2 thereof and looking in direction of the arrows.
Figure 3:
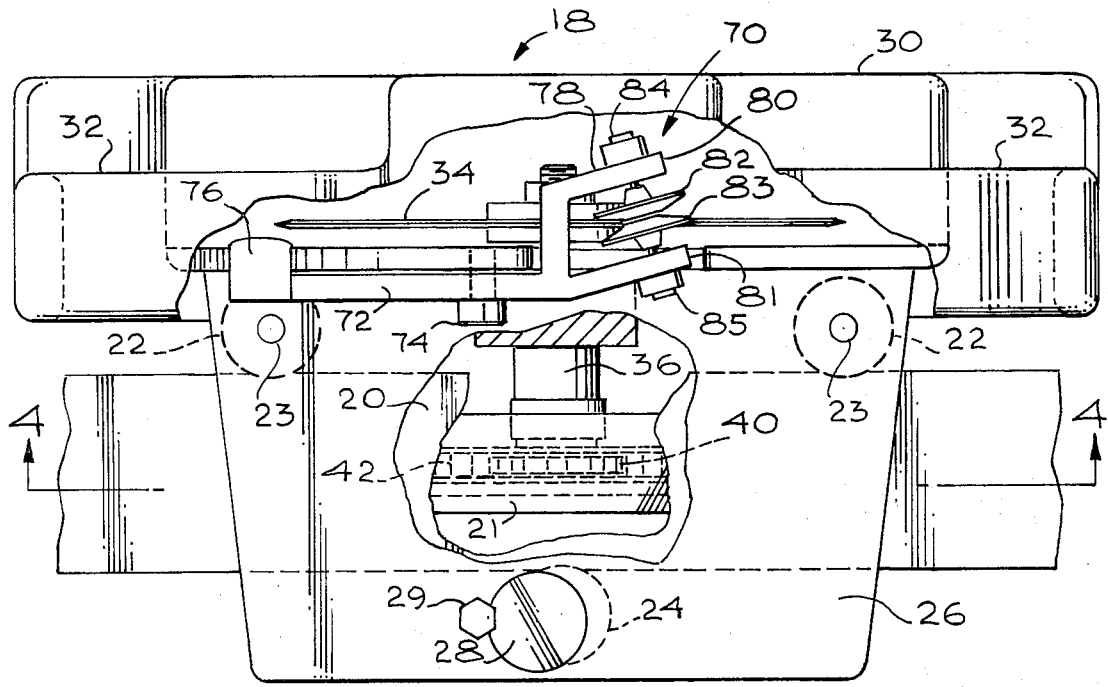
FIG. 3 is a plan view, partially broken away, of the cutting head shown in FIG. 1.
Figure 4:
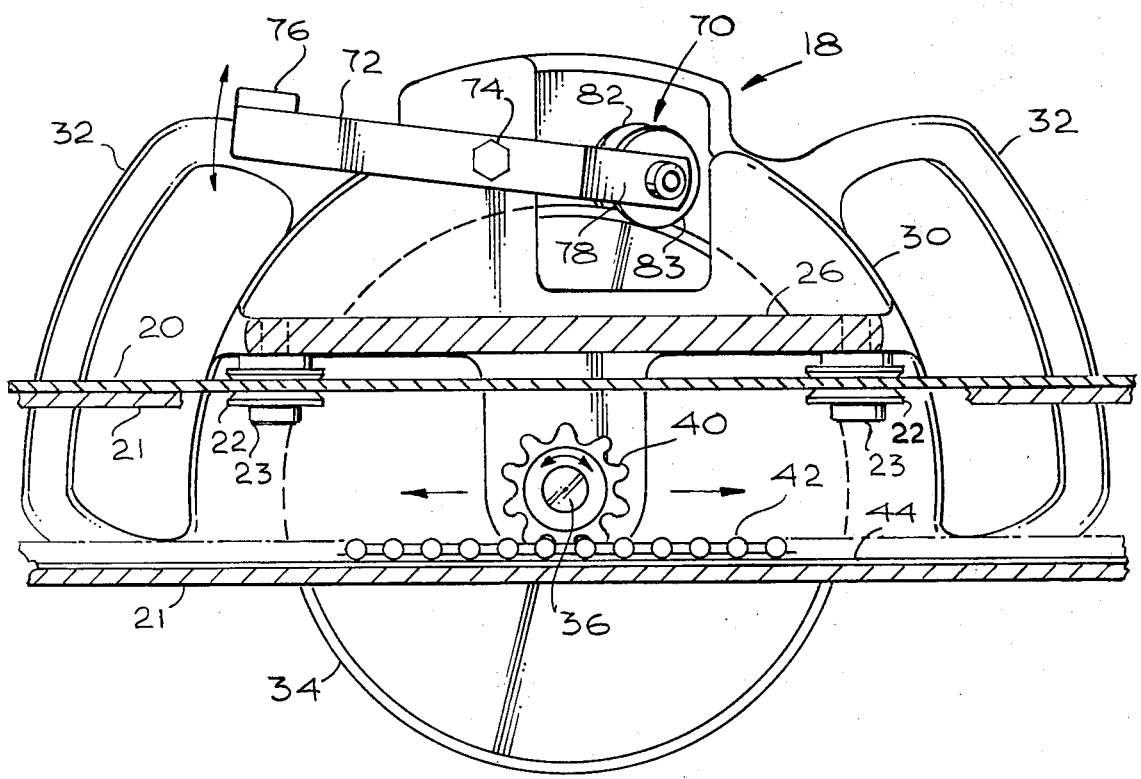
FIG. 4 is a rear view in section of the cutting head of FIG. 3, taken along the lines 4—4 thereof.

As shown in FIGS. 1-4, apparatus 10 in accordance with the invention comprises a frame 12, a cutting bed 14 with a handle 15 and a slot 16, and a cutting head 18 supported on a track 20 to run back and forth along the slot 16. The cutting head 18 is supported on the track 20 by means of three guide rollers such as 22 and 24. The guide rollers 22 are mounted on pivots 23 to the cutting head support bar 26 and are fixed in position with respect thereto. The guide roller 24 is also pivotably mounted to the support bar 26 by means of a pivot member 27, but the guide member 24 may be shifted in position relative to the bar 26 and guide rollers 22 by means of the eccentric element 28 and associated adjusting and locking bolt 29 which permits adjustment of the position of the guide roller 24 in order to develop appropriate alignment of the cutting head 18 on the track 20 and also to permit removal of the cutting head 18 from the track 20 as desired.

The cutting head 18 has a housing 30 bearing a pair of oppositely disposed handles 32 to permit ready operation of the cutting head from either end of the apparatus 10 and in either direction, i.e., back and forth transversely for cutting operation. The housing 30 is generally circular in transverse cross-section in order to accommodate an enclosed blade 34 which is mounted on a shaft 36 within a bearing journal 38 to permit rotation of the blade 34 on the shaft 36 as the cutting head 18 is moved translationally along the track 20.

On the end of the shaft 36 remote from the blade 34 is a sprocket wheel gear 40 which engages a flat roller-type chain 42 (such as a bicycle or motorcycle chain) which is affixed to the lower lip of a channel member 21 suspended from the track 20. The chain 42 rests on a resilient spacer 44 which serves to deaden the sound of the gear 40 in the chain 42 and maintain full engagement of the chain and gear. Also, it permits some variation in the ratio of gear 40 to blade 34, since different thicknesses of spacer 44 may be used with different sizes of gear 40 and roller chain 42. Releasable fasteners 43 permit ready removal and replacement of the chain-spacer assembly.

Extending outwardly from the frame 12 is a framework of rods 50 for supporting a roll 52 of material 54 to be cut by the cutting head 18. The rods 50 fit in casings 51 of the frame 12 and are joined by slip fittings 53, all of which are releasable to permit takedown of the support framework for storage or transport of the apparatus 10. Rollers 56 are provided for feeding the sheet material 54 over the frame 12 to be cut by the cutting head 18. The frame 12 is provided with means such as the ear 60 and the latching opening 62 for securing the apparatus to a table or bench by means of fasteners such as the bolt 64 or, alternatively, to permit mounting of the apparatus against a wall in a vertical attitude oriented 90° from the horizontal attitude shown in the figures.

The track 20 is supported on a pair of pillars 66 by mounting means 68 including adjustable lock screws 71. Thus, the height of the track 20 and its associated cutting head 18 may be adjusted up or down and locked in the selected position in order to accommodate the cutting of sheet materials of varying thicknesses while providing full protection for the operator against inadvertent injury through contact with the blade 34. The lower portion of the blade 34 is totally enclosed within the bed portion 14 of the frame 12 and the remainder of the blade 34 is totally enclosed within the housing 30 except for that portion actually engaged in cutting the material 54.

It is essential to maintain a sharp cutting edge on the blade 34, and the cutting head 18 is provided with a pivoted sharpener 70 which may be brought into automatic operation as needed. The sharpener 70 is shown comprising a lever 72 mounted about a pivot bolt 74, having a handle 76 at one end and a bifurcated support portion 78 at the opposite end. The two legs 80 and 81 of the bifurcated end 78 each separately supports its own grinding wheel 82 or 83, mounted upon separate shaft 84 or 85. As the handle 76 is moved up or down, the wheels 82, 83 and related sharpening assembly at the opposite end of the lever 72 are moved into or out of engagement with the cutting edge of the wheel 34. With the sharpening wheels 82, 83 engaging the cutting blade 34, rotation of the blade 34 causes the wheels 82, 83 to rotate also, honing both opposite surfaces of the blade edge simultaneously. It has been found that the desired bevel angle for the edge of the blade 34 is approximately 15° relative to the plane of the blade. Thus, the angle of bevel of the individual sharpening wheels 82, 83 is set at 15° relative to the plane of the sharpening wheels, and the angle of the lege 80, 81 is established at 15° relative to the plane of the blade so that the axis of the wheels 82, 83 is maintained at 15° relative to the axis of the blade. With the sharpening arrangement mounted in this fashion, the blade and wheels exhibit a tendency to wear together during the sharpening process, so that as the surfaces wear down the wheels are still able to be moved into position to sharpen the edge of the blade 34. The sharpening wheels 82 83 are carborundum stones of 120 grit which has been found to be preferable for the arrangement described.

In operation of apparatus in accordance with the invention, the roll 52 of sheet material 54 is placed in position on the support mechanism 50 of the frame 12 and the material 54 is fed through the rollers 56 and across the slot 16 to the point where the cut is to be made. While the material is being positioned in preparation for cutting, the cutting head 18 will be located at one end or the other of the track 20. Adjustment of the height of the track 20 and the cutting head 18 to accommodate the thickness of the material 54 may be accomplished by setting the lock screws 71 to the proper height position on the pillar 66. For the cutting operation, the cutting head 18 is moved briskly from one end of the slot 14 to the other. During such translational movement of the cutting head 18, the engagement of the sprocket 40 and the chain 42 rapidly rotates the shaft 36 and the blade 34, developing a sawing or slicing motion of the blade 34 relative to the material 54 and effectively cutting through the material. In FIG. 1, the cutting head 18 is shown making a cut during movement from the right-hand side to the left-hand side of the material 54. The next cut may be accomplished by movement of the cutting head 18 from left to right after an additional segment of the material 54 has been moved into position for cutting. By operation in this manner a very rapid and effective cutting operation may be realized.

Whenever the blade 34 tends to lose its sharp cutting edge, the sharpening wheels 82, 83 of the sharpening mechanism 70 may be pivoted downward into engagement with the blade 34 to effectuate the sharpening of the blade as already described. This sharpening operation can be carried out while the cutting head 18 is being moved back and forth in normal operation of cutting successive portions of the sheet material 54. After a few passes with the sharpening wheels 82, 83 engaged against the blade 34, the blade is again sharpened and the sharpening mechanism 70 may be rotated out of engagement with the blade 34 until it is again needed.

As described herein, apparatus in accordance with the present invention provides a distinct advance in the field of equipment for cutting the type of multi-layered tissue paper wadding type packing material for which the apparatus has been designed. The apparatus provides an extremely effective cutting implement for material which heretofore has been difficult to cut with available implements. In essence, the present invention provides a plant-type machine which for its intended use is substantially equivalent to a motor driven machine, yet is generally transportable and may be utilized in a variety of field applications where electrical power is unavailable for motor driven cutters. It is compact and versatile and may be used on a bench or accessory console table, on the wall, or even on the floor, and may be partially disassembled and stored compactly out of the way when not in use. The cutting head support mechanism is adjustable to accommodate a variety of thicknesses of material to be cut. Moreover, since in a machine of this type the maintenance of an extremely sharp blade is essential, the apparatus in accordance with the invention includes a very simple and effective sharpening mechanism which, when selectively positioned for use by the operator, automatically sharpens the cutting blade while the apparatus is in use. Thus the machine, by virtue of its extremely simple yet rugged structural design is virtually maintenance free.

Although there have been described above specific arrangements of fiber cutting apparatus with a self contained blade sharpener in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention.

What is claimed is:

1. Apparatus for cutting sheet material comprising:
   a frame including a slotted cutting bed portion for receiving a cutting blade;
   a track mounted on the frame for supporting a cutting head for movement along the slot;
   a readily replaceable roller chain releasably mounted in alignment with the track; and
   a cutting head mounted for translational movement along the track, the cutting head comprising a circular blade mounted on a rotatable shaft and extending partially into said slot below the cutting bed, and a drive sprocket of substantially lesser diameter than said circular blade also mounted on said shaft in position for engaging the roller chain during movement of the cutting head along said track, whereby the circular blade is rotated at a circumferential speed substantially exceeding the translational speed of the cutting head along the track.

2. Apparatus in accordance with claim 1 wherein the cutting head further includes a housing enclosing a major portion of the circular blade and having a pair of opposed handles mounted respectively to opposite sides of the housing to permit operator manipulation of the cutting head from either side of the apparatus, and wherein the cutting head is operable to cut sheet material by movement in either direction along the track.

3. Apparatus in accordance with claim 1 further including adjustable guide means mounting the cutting head on the track for translational movement along the track.

4. Apparatus in accordance with claim 3 wherein the track comprises an elongated piece of thin flat metal stock and the guide means comprise rollers positioned on opposite edges of the track for movement therealong.

5. Apparatus in accordance with claim 4 wherein the rollers are mounted two along one edge of the track and one along the opposite edge of the track, the one roller being mounted in the cutting head by means of an adjustable eccentric cam for aligning the cutting head on the track and for permitting removal of the cutting head from the track.

6. Apparatus in accordance with claim 1 further including adjustable means mounting the track to the frame to permit adjustment of the height of the track and the associated cutting head relative to the frame in order to accommodate varying thicknesses of sheet material to be cut; and
   locking means for affixing the adjustable track mounting means at a selected position relative to the frame.

7. Apparatus in accordance with claim 2 wherein the frame further includes a support mechanism for supporting a roll of sheet material to be cut by the cutting head.

8. Apparatus in accordance with claim 7 further including guide rollers for guiding the sheet material from a roll positioned on the support mechanism to the position of the cutting bed.

9. Apparatus in accordance with claim 2 further including an automatic blade sharpening mechanism pivotably mounted to the housing for selective engagement with the periphery of the blade.

10. Apparatus in accordance with claim 9 wherein the sharpening mechanism comprises a lever having a handle at one end outside the housing, an intermediate pivot point mounted to the housing, and grinding wheel support means at the other end located within the housing; the wheel supporting end of the lever within the housing being movable to the vicinity of the periphery of the blade by selective positioning of the handle portion of the lever outside the housing.

11. Apparatus in accordance with claim 10 wherein the wheel mounting end of the lever comprises a bifurcated portion, each leg of which bears a separate rotatable shaft on which a sharpening wheel is mounted for rotational movement.

12. Apparatus in accordance with claim 11 wherein the sharpening wheels are mounted at a preselected angle relative to the blade.

13. Apparatus in accordance with claim 12 wherein the wheels have edges bevelled at an angle equal to said preselected angle.

14. Apparatus in accordance with claim 1 further including releasable means mounting the roller chain to a support member connected to the track and a resilient spacer positioned between the chain and the support member in order to permit replacement of the chain and sprocket, whereby the ratio of blade diameter to sprocket diameter may be varied to change the circumferential speed of the blade for a given translational movement of the cutting head.

15. Apparatus in accordance with claim 10 wherein said lever handle is positioned adjacent the upper portion of one handle of said housing for convenient actuation by the thumb or forefinger of an operator holding said housing handle in his hand.

* * * * *